US012695398B2

(12) United States Patent
Kubota

(10) Patent No.: US 12,695,398 B2
(45) Date of Patent: Jul. 28, 2026

(54) ELECTROSTATIC CHUCK AND SUSCEPTOR

(71) Applicant: NGK INSULATORS, LTD., Nagoya (JP)

(72) Inventor: Daichi Kubota, Chita (JP)

(73) Assignee: NGK INSULATORS, LTD., Nagoya (JP)

( * ) Notice: Subject to any disclaimer, the term of this patent is extended or adjusted under 35 U.S.C. 154(b) by 132 days.

(21) Appl. No.: 18/432,156

(22) Filed: Feb. 5, 2024

(65) Prior Publication Data

US 2024/0413770 A1     Dec. 12, 2024

Related U.S. Application Data

(63) Continuation of application No. PCT/JP2023/021338, filed on Jun. 8, 2023.

(51) Int. Cl.
| | |
|---|---|
| *H02N 13/00* | (2006.01) |
| *H05B 6/10* | (2006.01) |

(52) U.S. Cl.
CPC ............. *H02N 13/00* (2013.01); *H05B 6/105* (2013.01)

(58) Field of Classification Search
CPC ...... H02N 13/00; H05B 6/105; H01L 21/687; H01L 21/67; H01L 21/6875;
(Continued)

(56) References Cited

U.S. PATENT DOCUMENTS 5,903,428 A * 5/1999 Grimard ............. H01L 21/6833
279/128
2009/0238734 A1 9/2009 Furuta et al.
(Continued)

FOREIGN PATENT DOCUMENTS

| JP | 2005-038931 A | 2/2005 |
|---|---|---|
| JP | 2010-123843 A | 6/2010 |
(Continued)

OTHER PUBLICATIONS

English translation of the International Search Report dated Aug. 23, 2023 (Application No. PCT/JP2023/021338).
(Continued)

*Primary Examiner* — Danny Nguyen
(74) *Attorney, Agent, or Firm* — Muncy, Geissler, Olds & Lowe, P.C.

(57)     ABSTRACT
An electrostatic chuck fixing a workpiece disposed on a mounting surface via electrostatic attraction with application of a voltage to an electrode buried inside the electrostatic chuck comprises: the mounting surface having an uneven structure including a plurality of protrusions two-dimensionally spaced apart with predetermined pitches and a depression that is flat between the protrusions, each of the protrusions includes: a flat portion having a flat surface being vertical in a thickness direction of the electrostatic chuck and having a uniform height; and a sloped portion around the flat portion having a height decreasing from the flat portion toward the depression, and the sloped portion has an upper surface with a slope angle of 65 degrees or higher and 84 degrees or lower in the thickness direction of the electrostatic chuck.

20 Claims, 4 Drawing Sheets

(58) Field of Classification Search
CPC .............. H01L 21/6833; H01L 21/683; H01L 21/67103; H01L 21/67109; H01L 21/6831; C23C 16/511
USPC ........................................................ 361/234
See application file for complete search history.

(56) References Cited

U.S. PATENT DOCUMENTS

| | | | |
|---|---|---|---|
| 2010/0144147 A1 | 6/2010 | Muneishi et al. | |
| 2013/0201597 A1 | 8/2013 | Ishikawa et al. | |
| 2014/0159325 A1* | 6/2014 | Parkhe | H01L 21/67109 |
| | | | 156/154 |
| 2017/0243778 A1 | 8/2017 | Kouno et al. | |
| 2019/0115244 A1* | 4/2019 | Inoue | H01L 21/6875 |
| 2019/0283212 A1* | 9/2019 | Mase | H01L 21/6875 |
| 2021/0006182 A1 | 1/2021 | Maeta | |

FOREIGN PATENT DOCUMENTS

| | | | |
|---|---|---|---|
| JP | 2011-515854 A | 5/2011 | |
| JP | 2012-060108 A | 3/2012 | |
| JP | 2013-153171 A | 8/2013 | |
| JP | 2014-027207 A | 2/2014 | |
| JP | 2015-008240 A | 1/2015 | |
| JP | 2017-191949 A | 10/2017 | |
| KR | 10-2017-0067719 A | 6/2017 | |
| KR | 10-2019-0110023 A | 9/2019 | |
| KR | 10-2021-0068318 A | 6/2021 | |
| WO | 2007/013619 A1 | 2/2007 | |
| WO | 2020/170514 A1 | 8/2020 | |

OTHER PUBLICATIONS

International Search Report (Application No. PCT/JP2023/021338) dated Aug. 22, 2023 (2 pages).
Korean Office Action (Application No. 10-2024-7006393) dated Jan. 7, 2025 (with English translation) (15 pages).
Korean Office Action (Application No. 10-2024-7006393) dated Nov. 21, 2025 (with English translation) (14 pages).
English translation of the International Search Report dated Aug. 22, 2023 (Application No. PCT/JP2023/021338).
Korean Notice of Submission of Third Party Observation for Korean Application No. 10-2024-7006393 dated Mar. 12, 2026.

\* cited by examiner

ELECTROSTATIC CHUCK AND SUSCEPTOR

BACKGROUND OF THE INVENTION

Field of the Invention

The present invention relates to an electrostatic chuck that fixes a workpiece such as a wafer via electrostatic attraction, and particularly to a shape of a mounting surface of the electrostatic chuck.

Description of the Background Art

Electrostatic chucks using electrostatic attraction for fixing workpieces have widely been used in etching apparatuses such as plasma etching apparatuses and film forming apparatuses such as PVD apparatuses, CVD apparatuses, and ion plating apparatuses to be used for semiconductor manufacturing processes. Examples of such electrostatic chucks include an already known electrostatic chuck having a configuration that a mounting surface on which a plate-shaped workpiece, for example, a semiconductor wafer is mounted is an uneven surface including a plurality of protrusions to support the workpiece and a depression through which a coolant gas can be flowed (e.g., see Japanese Patent Application Laid-Open No. 2010-123843 and Japanese Patent Application Laid-Open No. 2017-191949).

JP2010-123843 discloses an electrostatic chuck having a mounting surface including columnar, truncated conical, or hemispherical protrusions.

JP2017-191949 discloses an aspect in which protrusions on a mounting surface each include a top end portion located at the top end and including a rising top surface with a smooth curve, a column portion having a cross-sectional diameter decreasing from the bottom toward the top end portion, and a foot portion that connects the column portion and the bottom with smooth curves.

In the electrostatic chucks as disclosed in JP2010-123843 and JP2017-191949, there may be a case that particles are generated due to rubbing of a workpiece and the protrusions on the mounting surface. It is preferred to reduce the generation of the particles as much as possible, because it is a cause of a failure. As contact areas between a workpiece and protrusions are smaller, the particles are hardly produced. However, making the contact areas too small leads to a shortage of electrostatic attraction. The shortage of electrostatic attraction may cause a wafer to be lifted by a coolant gas that flows through depressions.

SUMMARY

The present invention relates to an electrostatic chuck that fixes a workpiece such as a wafer via electrostatic attraction, and particularly to a shape of a mounting surface of the electrostatic chuck.

An electrostatic chuck fixing a workpiece via electrostatic attraction according to the present invention includes: a mounting surface on which the workpiece is disposed; and an electrostatic chuck electrode which is buried inside the electrostatic chuck and to which a voltage is applied so that the workpiece disposed on the mounting surface is fixed via electrostatic attraction, wherein the mounting surface has an uneven structure including a plurality of protrusions two-dimensionally spaced apart with predetermined pitches, and a depression that is flat between the protrusions, each of the protrusions includes: a flat portion having a flat surface, the flat surface being vertical to a thickness direction of the electrostatic chuck and having a uniform height; and a sloped portion around the flat portion, the sloped portion having a height decreasing from the flat portion toward the depression, and the sloped portion has an upper surface with a slope angle of 65 degrees or higher and 84 degrees or lower to the thickness direction of the electrostatic chuck.

According to this invention, the electrostatic attraction in the electrostatic chuck can be increased without increasing a contact area between a workpiece and the electrostatic chuck.

Thus, the object of the present invention is to implement an electrostatic chuck with increased electrostatic attraction, without increasing a contact area between a workpiece and the electrostatic chuck.

These and other objects, features, aspects, and advantages of the present invention will become more apparent from the following detailed description of the present invention when taken in conjunction with the accompanying drawings.

DESCRIPTION OF THE PREFERRED EMBODIMENTS

[Wafer Mount]

Figure 1:
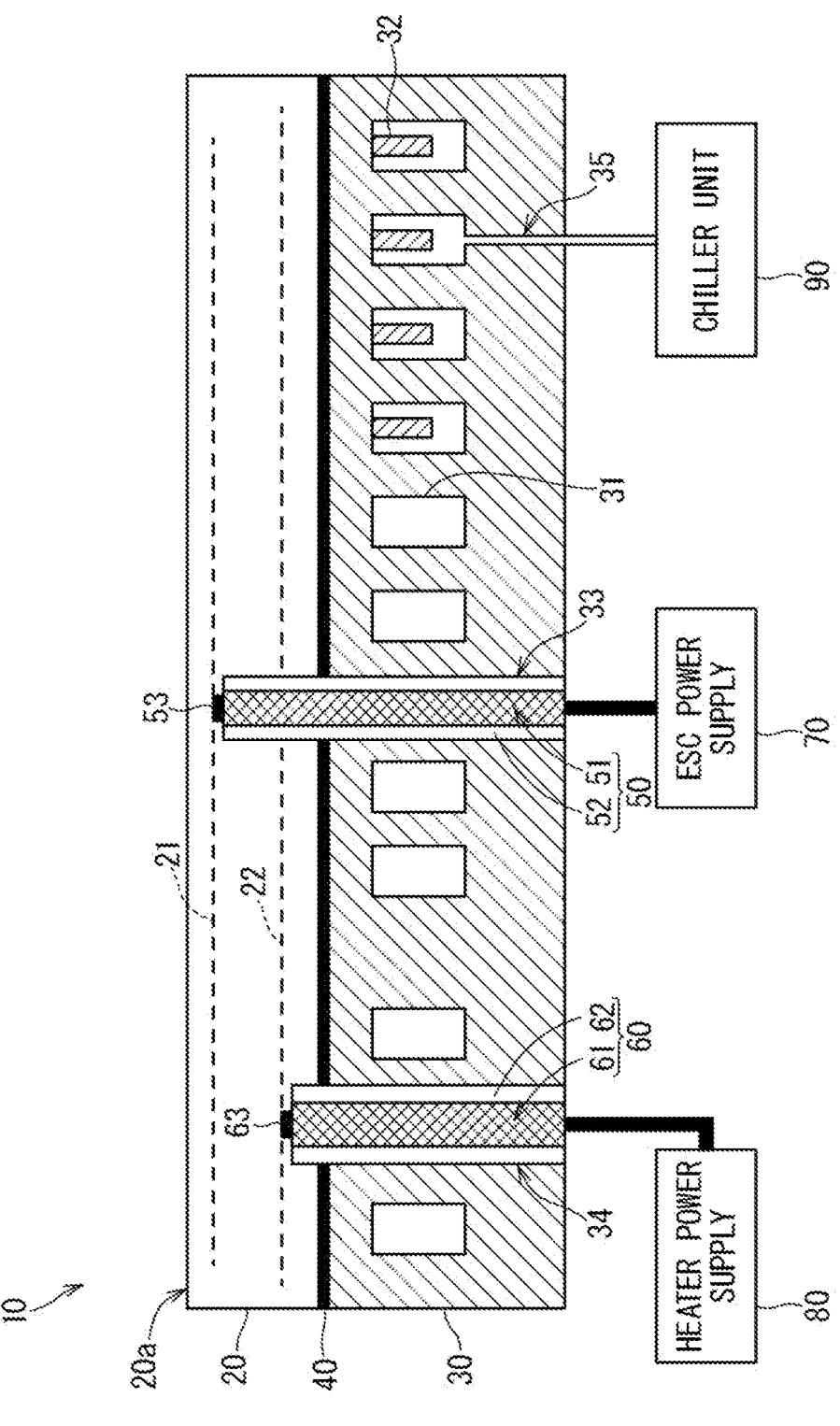
FIG. 1 is a schematic cross sectional view illustrating a structure of a wafer mount 10 including an electrostatic chuck 20.

FIG. 1 is a schematic cross sectional view illustrating a structure of a wafer mount 10 including an electrostatic chuck 20 according to an embodiment of the present invention, along a thickness direction of the electrostatic chuck 20. The wafer mount 10 is also referred to as a susceptor, etc., and fixes, with the electrostatic chuck 20, a semiconductor wafer (wafer) as an aspect of a workpiece when a predetermined treatment such as a plasma treatment is applied on the wafer.

The wafer mount 10 generally has a structure in which the electrostatic chuck 20 is stacked on a cooling plate 30 with the electrostatic chuck 20 and the cooling plate 30 being bonded together through a bonding layer 40.

The electrostatic chuck 20 is a plate-shaped (e.g., disc-like) member made of an insulating ceramic such as $Al_2O_3$ or AlN into which an electrostatic chuck electrode (ESC electrode) 21 for electrostatically attracting a wafer is buried. Furthermore, a heater electrode 22 for heating the wafer is also buried in the electrostatic chuck 20 in FIG. 1. The electrostatic chuck 20 with such a structure is also referred to as an electrostatic chuck heater. The ESC electrode 21 is buried closer to a mounting surface 20a than the heater electrode 22 in the electrostatic chuck 20 of FIG. 1. In the electrostatic chuck 20, a main surface opposite to a bonded surface to the bonding layer 40 is the mounting surface 20a on which a wafer is mounted.

Exemplifications of materials of the ESC electrode 21 and the heater electrode 22 include metals such as W, Mo, Ti, Si, and Ru, and carbide and nitride thereof.

The cooling plate 30 includes a flow path 31. The flow path 31 is a part for cooling the electrostatic chuck 20 and further a wafer fixed to the mounting surface 20*a* via electrostatic attraction, through external introduction of a coolant (e.g., water) to the flow path 31. A preferable example of the flow path 31 is a continuous groove formed in a spiral shape in a plan view so that almost an entire region of the electrostatic chuck 20 is cooled. Alternatively, the flow path 31 may include a plurality of independent grooves each having an open ring shape and concentrically arranged in a plan view.

Although the cooling plate 30 is preferably made of a metal such as aluminum, it may be made of a ceramic or a composite of a metal and a ceramic.

A fin 32 may be formed to protrude from at least one location of the flow path 31. The fin 32 has a function of increasing a flow rate of a coolant at the disposed portion, thereby to locally increase the cooling efficiency. The shape and the size of the fin 32 are appropriately determined depending on a cooling state required for the disposed portion. The fin 32 may be made of a material identical to or different from that of the cooling plate 30. There may be a case that the fin 32 is not provided.

The electrostatic chuck 20 and the cooling plate 30 are bonded together through the bonding layer 40 by heat and pressure bonding of applying pressure to a laminated body while heating the laminated body at a predetermined temperature. The laminated body is obtained by, for example, adhering a plated ceramic member constituting the electrostatic chuck 20 to a member constituting the cooling plate 30 via an adhesive layer such as an adhesive or an adhesive sheet made of a resin, a brazing filler metal, or a ceramic bond.

The wafer mount 10 further includes a first power feeder 50 that feeds power to the ESC electrode 21, and a second power feeder 60 that feeds power to the heater electrode 22.

The first power feeder 50 is disposed along the laminating direction of the electrostatic chuck 20 and the cooling plate 30, and includes a feed terminal 51, an insulating component (sleeve) 52 surrounding the feed terminal 51, and a connector 53 disposed on one end of the feed terminal 51 and connected to the ESC electrode 21. The first power feeder 50 is inserted into a through hole 33 and is exposed outside on the other end side. Then, the feed terminal 51 is electrically connected, on the other end side, to an ESC power supply 70 placed outside.

In the wafer mount 10, when the ESC power supply 70 applies a DC voltage to the ESC electrode 21 through the feed terminal 51 and the connector 53 with a wafer being disposed on the mounting surface 20*a* of the electrostatic chuck 20, the wafer is electrostatically attracted to the mounting surface 20*a*.

Furthermore, the second power feeder 60 includes a feed terminal 61, an insulating component (sleeve) 62 surrounding the feed terminal 61, and a connector 63 disposed on one end of the feed terminal 61 and connected to the heater electrode 22. The second power feeder 60 is inserted into a through hole 34 provided in the cooling plate 30, and is exposed outside on the other end side. Then, the feed terminal 61 is electrically connected, on the other end side, to a heater power supply 80 placed outside.

In the wafer mount 10, when the heater power supply 80 energizes the heater electrode 22 through the feed terminal 61 and the connector 63, the wafer mount 10 and further a wafer are heated.

Furthermore, a coolant entrance 35 communicating with the flow path 31 penetrates the cooling plate 30. Although FIG. 1 illustrates only the single coolant entrance 35 to simplify the drawing, the coolant entrances 35 are actually formed at both ends of the groove of the flow path 31. Each of the coolant entrances 35 is connected to a chiller unit 90 that cyclically supplies a coolant to the flow path 31.

The wafer mount 10 with the aforementioned structure can heat a wafer to have a predetermined temperature distribution, by balancing heating and cooling the wafer through simultaneously heating the heater electrode 22 by energization and cyclically supplying the coolant to the flow path 31, with the wafer disposed on the mounting surface 20*a* being fixed via electrostatic attraction with application of a voltage to the ESC electrode 21.

The wafer mount 10 can be manufactured in a procedure of, for example, preparing the cooling plate 30 and the electrostatic chuck 20 in which the ESC electrode 21 and the heater electrode 22 are buried, bonding the electrostatic chuck 20 and the cooling plate 30 together through the bonding layer 40, and burying the first power feeder 50 and the second power feeder 60.

The electrostatic chuck 20 is produced by, for example, hot-press sintering a green sheet laminated body formed by adhesively laminating a plurality of ceramic green sheets including a ceramic green sheet on which electrode patterns for the ESC electrode 21 have been print formed and a ceramic green sheet on which electrode patterns for the heater electrode 22 have been print formed.

In this embodiment, however, emboss processing (uneven processing) which will be described later, is performed on the mounting surface 20*a* of the electrostatic chuck 20 after the hot-press sintering to form multiple protrusions.

Furthermore, the cooling plate 30 can be produced by cutting a bulk metal, or gel-casting or other casting methods.

[Details of Mounting Surface]

Figure 2:
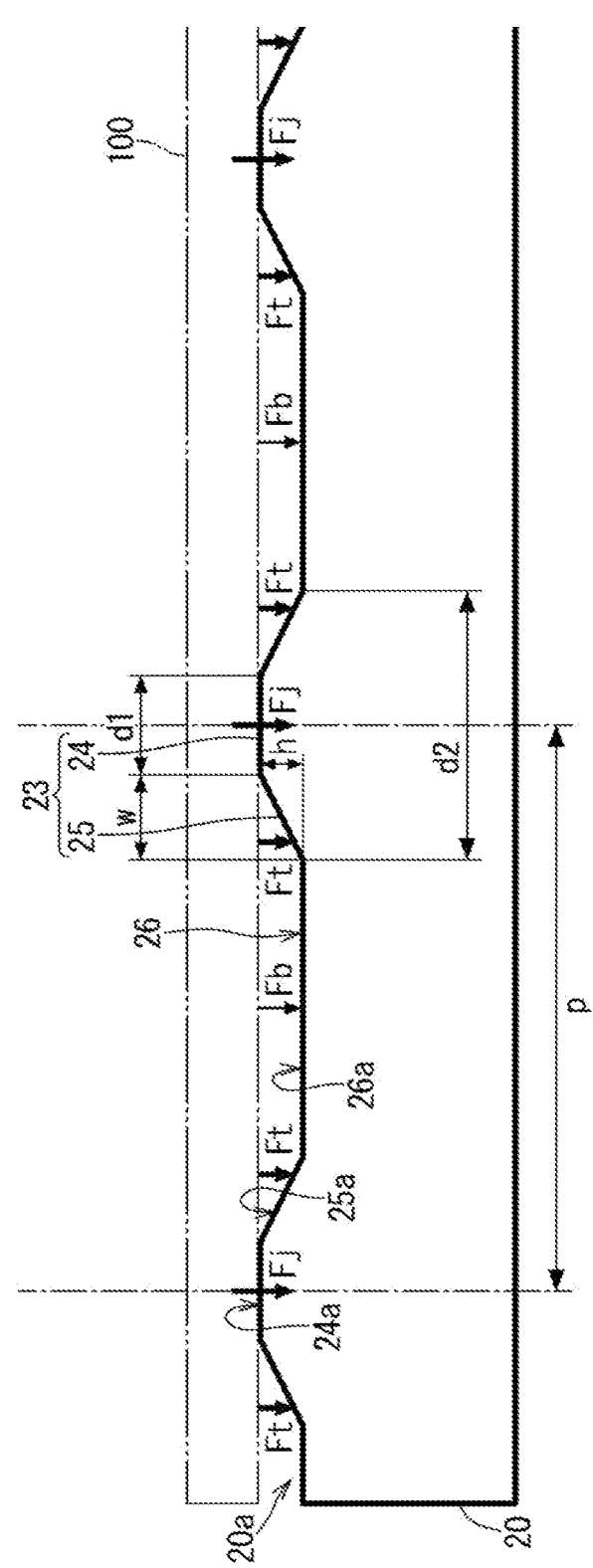
FIG. 2 is a schematic cross sectional view illustrating a detailed structure of a mounting surface 20a of the electrostatic chuck 20.

FIG. 2 is a schematic cross sectional view illustrating a detailed structure of the mounting surface 20*a* of the electrostatic chuck 20 along the thickness direction of the electrostatic chuck 20. FIG. 2 also illustrates a state in which the wafer 100 is mounted on the mounting surface 20*a*.

Although FIG. 1 illustrates the uniformly flat mounting surface 20*a* to simplify the drawing, the mounting surface 20*a* of the electrostatic chuck 20 according to the embodiment of the present invention actually has an uneven structure including multiple (a plurality of) protrusions 23 two-dimensionally spaced apart with a predetermined pitch p, and a depression 26 between the protrusions 23. In the following description, the protrusions 23 may be referred to as embossed portions 23, and the surface of the depression 26 may be referred to as a bottom surface 26*a*. Each of the pitches p is set approximately to 2 mm to 20 mm.

Each of the embossed portions 23 includes a flat portion 24 and a sloped portion 25. The flat portion 24 is a portion having a flat surface 24*a*. The flat surface 24*a* is substantially vertical to the thickness direction of the electrostatic chuck 20 and flat, and has a uniform height (a vertical distance from the bottom surface 26*a* of the depression 26) h. The flat surface 24*a* and the bottom surface 26*a* of the depression 26 may have fine unevenness inevitably generated when the electrostatic chuck 20 is manufactured. Thus, the height h may be, for example, a gap between respective center lines in roughness of the flat surface 24*a* and the bottom surface

5

26a. Each of the center lines in roughness of the flat surface 24a and the bottom surface 26a may be based on an average value of measurement values measured at a plurality of spots in a method defined by JIS B 0601: 1994, JIS B 0031: 1994. The height h approximately ranges from 10 µm to 50 µm.

The sloped portion 25 is a portion located around the flat portion 24 in a plan view of the mounting surface 20a and having a height (a vertical distance from the bottom surface 26a of the depression 26) continuously or intermittently decreasing from the flat portion 24 toward the depression 26.

In a preferable aspect, the flat surface 24a of each of the embossed portions 23 is shaped like a circle with a diameter d1 with respect to the center of the embossed portion 23 in a plan view, and each of the embossed portions 23 is also shaped like a circle with a diameter d2 in the plan view. Accordingly, the sloped portion 25 is shaped like a ring with a width w in the plan view. Furthermore, an upper surface 25a of the sloped portion 25 is linearly tapered in a cross-sectional view. The sloped portion 25 with the upper surface 25a linearly tapered in the cross-sectional view may be particularly referred to as a tapered portion 25. The diameter d1 approximately ranges from 0.5 mm to 3 mm, similarly to conventional embossed portions without the sloped portions 25.

The uneven structure of the mounting surface 20a allows only the flat portions 24 of the embossed portions 23 to be actually in contact with the wafer 100 being disposed on the electrostatic chuck 20 and directly support the wafer 100 from the bottom. In some cases, a coolant gas for cooling the wafer 100 is caused to flow between the wafer 100 and the sloped portions 25 and the depressions 26 that are not in contact with the wafer 100.

As described above, when the wafer 100 is fixed to the electrostatic chuck 20 via electrostatic attraction, the ESC power supply 70 applies a DC voltage to the ESC electrode 21. This generates a Johnsen-Rahbek force (hereinafter referred to as a JR force) Fj between the wafer 100 and the flat portions 24 of all the embossed portions 23 which are in contact with the wafer 100.

Not only the JR force Fj but also a space coulomb force Fc generated from portions that are not in contact with but in proximity to the wafer 100 contributes to the electrostatic attraction for fixing the wafer 100. Specifically, the space coulomb force Fc consists of a sloped-portion space coulomb force Ft that acts between (the upper surfaces 25a of) all the sloped portions 25 and the wafer 100, and a bottom space coulomb force Fb that acts between (the whole of) bottom surface 26a of) the depression 26 and the wafer 100. The space coulomb force Fc may be hereinafter referred to as a total space coulomb force Fc.

In other words, the whole attraction force F of the electrostatic attraction for fixing the wafer 100 to the electrostatic chuck 20 is represented by

6

$$F = Fj + Fc = Fj + Ft + Fb.$$

In the aforementioned case, the sloped-portion space coulomb force Ft is inversely proportional to a distance between each of the sloped portions 25 and the wafer 100, and the bottom space coulomb force Fb is inversely proportional to a distance between the bottom surface 26a and the wafer 100. When the pitch p of the embossed portions 23 and the plan size (diameter) d1 and the height h of the flat portion 24 are constant and deformation of the wafer 100 is negligible, the following relationship holds as long as the depression 26 certainly exists between the adjacent embossed portions 23: a value of the sloped-portion space coulomb force Ft is sufficiently larger than that of the bottom space coulomb force Fb as the width w of the sloped portion 25 is greater, and consequently, the total space coulomb force Fc and further the whole attraction force F increase.

This means that the whole attraction force F can be increased by providing the embossed portions 23 with the sloped portions 25 to cause the sloped-portion space coulomb force Ft to act, instead of increasing the plan size (diameter) d1 of the flat portion 24 of each of the embossed portions 23 to increase the JR force Fj.

When the plan size (diameter) d1 of the flat portion 24 is increased, the contact area between the wafer 100 and the electrostatic chuck 20 is increased, and thus particles are easily generated. On the other hand, in the case that the sloped portions 25 are provided, particles are not easily generated because the sloped portions 25 are not in contact with the wafer 100.

In other words, provision of the embossed portions 23 with the sloped portions 25 makes it possible to increase the electrostatic attraction between the wafer 100 and the electrostatic chuck 20 without generating particles more easily.

When the upper surfaces 25a of the sloped portions 25 are tapered, the advantage of providing the embossed portions 23 with the sloped portions 25 can be evaluated by the magnitude of an angle (hereinafter a slope angle) α between the upper surface 25a and a thickness direction of the electrostatic chuck 20.

Table 1 indicates, as a list, simulation results of the bottom space coulomb force Fb and the sloped-portion space coulomb force Ft by varying a value of the slope angle α (also referred to as a tapered angle α) in the electrostatic chuck 20 with the tapered upper surfaces 25a, together with the JR force Fj previously experimentally obtained, the total space coulomb force Fc obtained from the simulation results, the whole attraction force F that is a sum of the JR force Fj and the total space coulomb force Fc, an increasing rate of the whole attraction force F, and an aspect ratio w/h.

TABLE 1

| SLOPE (TAPERED) ANGLE α | JR FORCE Fj | BOTTOM SPACE COULOMB FORCE Fb | SLOPED-PORTION SPACE COULOMB FORCE Ft | TOTAL SPACE COULOMB FORCE Fc | WHOLE ATTRACTION FORCE F | INCREASING RATE | ASPECT RATIO |
|---|---|---|---|---|---|---|---|
| 0 | 18 | 8.20 | 0.00 | 8.20 | 26.20 | 0.00% | 0.00 |
| 10 | 18 | 8.19 | 0.03 | 8.22 | 26.22 | 0.08% | 0.18 |
| 20 | 18 | 8.19 | 0.06 | 8.24 | 26.24 | 0.17% | 0.36 |
| 30 | 18 | 8.18 | 0.09 | 8.27 | 26.27 | 0.27% | 0.58 |
| 40 | 18 | 8.16 | 0.14 | 8.30 | 26.30 | 0.39% | 0.84 |

TABLE 1-continued

| SLOPE (TAPERED) ANGLE α | JR FORCE Fj | BOTTOM SPACE COULOMB FORCE Fb | SLOPED-PORTION SPACE COULOMB FORCE Ft | TOTAL SPACE COULOMB FORCE Fc | WHOLE ATTRACTION FORCE F | INCREASING RATE | ASPECT RATIO |
|---|---|---|---|---|---|---|---|
| 45 | 18 | 8.16 | 0.17 | 8.32 | 26.32 | 0.47% | 1.00 |
| 50 | 18 | 8.15 | 0.20 | 8.35 | 26.35 | 0.56% | 1.19 |
| 55 | 18 | 8.14 | 0.24 | 8.38 | 26.38 | 0.68% | 1.43 |
| 60 | 18 | 8.12 | 0.29 | 8.42 | 26.42 | 0.84% | 1.73 |
| 65 | 18 | 8.11 | 0.37 | 8.48 | 26.48 | 1.05% | 2.14 |
| 70 | 18 | 8.08 | 0.48 | 8.56 | 26.56 | 1.38% | 2.75 |
| 75 | 18 | 8.03 | 0.68 | 8.71 | 26.71 | 1.94% | 3.73 |
| 80 | 18 | 7.92 | 1.11 | 9.02 | 27.02 | 3.14% | 5.67 |
| 81 | 18 | 7.88 | 1.26 | 9.14 | 27.14 | 3.57% | 6.31 |
| 82 | 18 | 7.83 | 1.45 | 9.28 | 27.28 | 4.13% | 7.12 |
| 83 | 18 | 7.76 | 1.72 | 9.48 | 27.48 | 4.87% | 8.14 |
| 84 | 18 | 7.67 | 2.09 | 9.75 | 27.75 | 5.93% | 9.51 |
| 85 | 18 | 7.52 | 2.65 | 10.17 | 28.17 | 7.52% | 11.43 |
| 86 | 18 | 7.29 | 3.57 | 10.86 | 28.86 | 10.15% | 14.30 |
| 87 | 18 | 6.83 | 5.34 | 12.18 | 30.18 | 15.19% | 19.08 |
| 88 | 18 | 5.71 | 9.76 | 15.47 | 33.47 | 27.73% | 28.64 |
| 89 | 18 | 0.55 | 29.95 | 30.50 | 48.50 | 85.12% | 57.29 |

In the simulation, the plan size (diameter) d2 of the embossed portion 23 is 0.5 mm, the height h of the flat portion 24 of the embossed portion 23 is 20 μm, a contact area rate of the wafer 100 that is a ratio of the total area of the flat surfaces 24a of the flat portions 24 of the embossed portions 23 to the whole planar area of the mounting surface 20a is 3%, and a value of the DC voltage to be applied by the ESC power supply 70 to the ESC electrode 21 to electrostatically attract the wafer 100 is 500 V.

The whole attraction force F (26.2 torr) and the JR force Fj (18 torr) on the electrostatic chuck 20 including the embossed portions 23 without the sloped portions 25, that is, the slope angle α=0 degree, which previously experimentally have been obtained, are used in the simulation. Strictly speaking, the values of the forces under the slope angle α=0 degree in Table 1 are experimental values. The increasing rate of the whole attraction force F is an increasing rate with respect to the whole attraction force F under the slope angle α=0 degree.

As seen from Table 1, the increasing rate of the whole attraction force F tends to increase as the slope angle α is higher.

In this embodiment, a range of the slope angle α of 65 degrees or higher in which the whole attraction is increased by 1% or more with respect to the embossed portions 23 without the sloped portions 25 is a preferable range of the slope angle α when the embossed portions 23 include the sloped portions 25. This is because it is considered to be a significant increase in the whole attraction force F in the range with respect to the case without the sloped portions 25. Table 1 also indicates that setting the slope angle α to, for example, about 30 degrees or so hardly provide an effect of increasing the attraction.

Note that the slope angle α is set to 84 degrees or lower. In the case that the slope angle α exceeds 84 degrees, it is likely that the wafer 100 is in contact with the sloped portions 25 due to deformation of the wafer 100 when the wafer 100 is fixed via electrostatic attraction, which is not preferable.

Namely, in this embodiment, the surface of the electrostatic chuck 20 is contoured with the multiple embossed portions 23, with the sloped portions 25 each having the slope angle α of 65 degrees or higher and 84 degrees or lower to a thickness direction of the electrostatic chuck 20 being provided around the flat portions 24 of the embossed portions 23. This increases the electrostatic attraction of the electrostatic chuck 20 with respect to the wafer 100, without increasing the contact area to the wafer 100. This range of the slope angle α of 65 degrees or higher and 84 degrees or lower approximately corresponds to a range of the aspect ratio w/h of 2.1 or higher and 9.5 or lower which corresponds to a tangent (tan) of the slope angle α.

The advantage of an increase in the electrostatic attraction from the electrostatic chuck 20 can be similarly obtained in the case that a workpiece other than the wafer 100 is disposed on the electrostatic chuck 20.

Providing the embossed portions 23 with the sloped portions 25 makes it possible to increase the electrostatic attraction without an increase in area of the flat surfaces 24a of the flat portions 24, that is, without an increase in the contact area to the wafer 100 as compared to the case without the sloped portions 25. Put it differently, providing the sloped portions 25 while reducing areas of the flat surfaces 24a makes it possible to generate the electrostatic attraction equivalent to those in the case without the sloped portions 25, while the contact area to the wafer 100 is reduced.

[Example Fine Shape of Sloped Portion]

Figure 3:
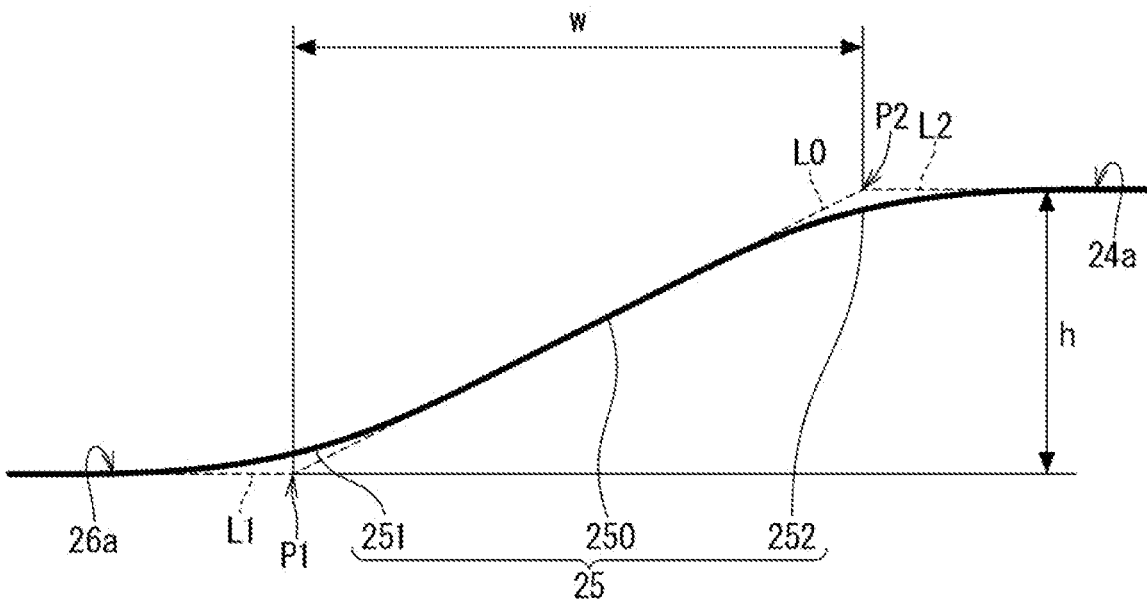
FIG. 3 illustrates an enlarged cross-sectional view of the vicinity of a sloped portion 25 of an embossed portion 23.

FIG. 3 schematically illustrates an enlarged cross-sectional view of the vicinity of the sloped portion 25 of one of the embossed portions 23 along the thickness direction of the electrostatic chuck 20.

FIG. 2 illustrates a state in which the upper surface 25a of the sloped portion 25 that is linear in a cross-sectional view is continuous with the flat surface 24a of the flat portion 24 and the bottom surface 26a of the depressions 26. When the actual sloped portion 25 is microscopically viewed, the upper surface 25a may include a center portion 250 that is a flat slope and linear in a cross-sectional view, and curved portions 251 and 252 that are curved (curvilinear in a cross-sectional view) leading to both ends of the center portion 250 as illustrated in FIG. 3. The curved portion 251 is smoothly continuous with the bottom surface 26a of the depression 26, and the curved portion 252 is smoothly continuous with the flat surface 24a of the flat portion 24.

In the case that the curved portion 251 is formed, particles hardly remain in boundaries between the embossed portions 23 and the depression 26. In the case that the curved portion 252 is formed, the embossed portions 23 hardly cut away by rubbing against the wafer 100 when the wafer 100 is in contact with the embossed portions 23.

Since formation ranges of the curved portions 251 and 252 are very narrow ranges of both ends of the sloped portion 25, a virtual extended surface of the center portion 250 of the upper surface 25a, a virtual extended surface of the bottom surface 26a of the depression 26, and a virtual extended surface of the flat surface 24a of the flat portion 24 can be regarded as the upper surface 25a of the sloped portion 25, the bottom surface 26a of the depression 26, and the flat surface 24a of the flat portion 24, respectively.

In the cross-sectional view of FIG. 3, a straight line L0 corresponds to the virtual extended surface of the center portion 250, a straight line L1 corresponds to the virtual extended surface of the bottom surface 26a of the depression 26, and a straight line L2 corresponds to the virtual extended surface of the flat surface 24a. Furthermore, a vertical distance and a horizontal distance between an intersection point P1 of the straight line L0 and the straight line L1 and an intersection point P2 of the straight line L0 and the straight line L2 can be regarded as the height h and the width w, respectively. Specifically, the intersection point P1 corresponds to a cross section of an intersection line of the virtual extended surface of the center portion 250 and the virtual extended surface of the bottom surface 26a, and the intersection point P2 corresponds to a cross section of an intersection line of the virtual extended surface of the center portion 250 and the virtual extended surface of the flat surface 24a. Furthermore, an angle between the straight line L0 and the thickness direction of the electrostatic chuck 20 can be regarded as the slope angle $\alpha$.

Each of all or a part of the embossed portions 23 included in the electrostatic chuck 20 may have the sloped portion 25 as illustrated in FIG. 3. Alternatively, the electrostatic chuck 20 may include the embossed portion 23 including only either of the curved portions 251 and 252.

The uneven structure including the embossed portions (protrusions) 23 including the sloped portions 25 tapered or having other shapes, and the depression 26 can be formed by applying, to a flat surface of a plated ceramic member to be the electrostatic chuck 20, machining of an appropriate combination of various known machining processes such as sand blasting, machining processing, ultrasonic machining, laser beam machining, and polishing, prior to bonding the ceramic member to a component to be the cooling plate 30, for example.

As described above, according to this embodiment, a surface of an electrostatic chuck to which a workpiece, for example, a semiconductor wafer is fixed via electrostatic attraction is contoured with multiple embossed portions in order to reduce a contact area between the workpiece and the electrostatic chuck, with sloped portions each with an angle of 65 degrees or higher and 84 degrees or lower to a thickness direction of the electrostatic chuck being provided around the flat portions of the embossed portions, which makes it possible to increase the electrostatic attraction in the electrostatic chuck without increasing the contact area.

MODIFICATIONS

The slope angles $\alpha$ of the sloped portions 25 of the respective embossed portions 23 provided on the mounting surface 20a of the electrostatic chuck 20 need not be identical but may be different from each other, depending on the positions of the respective embossed portions 23 in a plan view of the electrostatic chuck 20.

For example, the slope angle $\alpha$ of the embossed portion 23 in the perimeter of the electrostatic chuck 20 may be larger than that of the embossed portion 23 in the center of the electrostatic chuck 20. Since the embossed portion 23 in the perimeter is larger in attraction than the embossed portion 23 in the center in the aforementioned case, even when a wafer to be adsorbed is warped, it is possible to inhibit the wafer from being separated from the mounting surface 20a in the perimeter and suitably fix the wafer.

Although the above embodiment mainly describes a structure in which the heights of the sloped portion 25 continuously decrease from the flat portion 24 toward the depression 26, specifically, a structure with the tapered sloped portions 25, the heights of the sloped portions 25 may be intermittently changed as will be described hereinafter.

Figure 4:
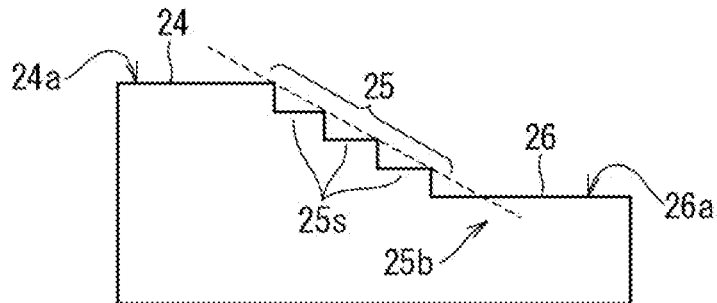
FIG. 4 illustrates the embossed portion 23 according to one modification.

FIG. 4 illustrates the embossed portion 23 including the sloped portion 25 with such a shape, according to one modification. Specifically, FIG. 4 schematically illustrates an enlarged cross-sectional view of the vicinity of the sloped portion 25 along the thickness direction of the electrostatic chuck 20. The embossed portion 23 in FIG. 4 includes the sloped portion 25 including a plurality of steps 25s formed multistage-wise. In other words, the height of the sloped portion 25 is intermittently changed from the flat portion 24 toward the depression 26. In the aforementioned case, an inclined line 25b passing through edges of the steps 25s in a cross section can be handled as, for example, a straight line of the upper surface 25a of the tapered sloped portion 25 in a cross section as illustrated in FIG. 2. In other words, an angle between the inclined line 25b and the thickness direction of the electrostatic chuck 20 corresponds to the slope angle $\alpha$.

The embossed portion 23 with the multistage sloped portion 25 including the plurality of steps 25s can be formed by, for example, laser beam machining.

Even the electrostatic chuck 20 in which the mounting surface 20a has the uneven structure with the embossed portions 23 including the multistage sloped portion 25 can provide an advantage of increasing the electrostatic attraction in the electrostatic chuck 20 without increasing a contact area between a workpiece and the electrostatic chuck 20.

[Different Aspect of Electrostatic Chuck]

Figure 5:
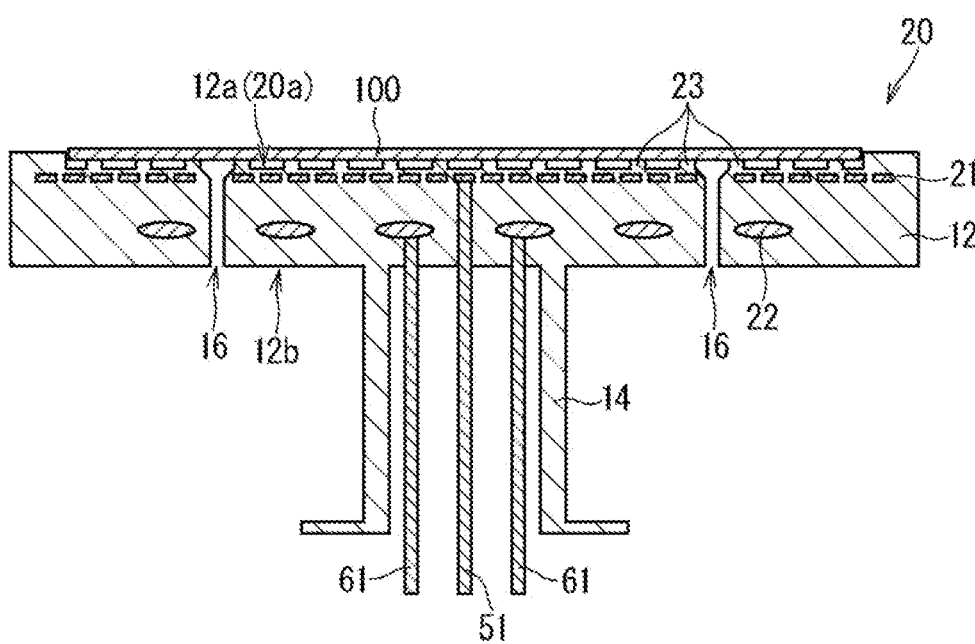
FIG. 5 illustrates the electrostatic chuck 20 in a different aspect.

FIG. 5 is a schematic cross sectional view of the electrostatic chuck 20 in an aspect different from that of FIG. 1 and along the thickness direction. The electrostatic chuck 20 in FIG. 5 generally includes a plate-shaped (e.g., disc-like) ceramic plate 12 made of an insulating ceramic identical to that of the electrostatic chuck 20 in FIG. 1, and a hollow ceramic shaft 14 bonded to the ceramic plate 12.

A main surface 12a of the ceramic plate 12 is the mounting surface 20a including the multiple protrusions (embossed portions) 23 similarly to those in FIG. 2. Although FIG. 5 simplifies the illustration, each of the embossed portions 23 on the main surface 12a includes the flat portion 24 and the sloped portion 25 as illustrated in FIG. 2. In other words, the sloped portions 25 each with an angle of 65 degrees or higher and 84 degrees or lower to a thickness direction of the electrostatic chuck are formed around the flat portions 24 of the embossed portions 23. FIG. 5 also illustrates a state in which the wafer 100 is mounted on the mounting surface 20a.

The ceramic shaft 14 is preferably made of an insulating ceramic identical to that of the ceramic plate 12, and is solid-phase or diffusion bonded to another main surface 12b of the ceramic plate 12.

Similarly to the electrostatic chuck 20 in FIG. 1, the ESC electrode 21 for electrostatically attracting a wafer, and the heater electrode 22 for heating the wafer are buried in the ceramic plate 12. Energization to the ESC electrode 21 and the heater electrode 22 is performed through the rod-shaped feed terminal 51 and the feed terminals 61, respectively, that are inserted into the inner space of the hollow ceramic shaft 14. FIG. 5 omits the illustration of the sleeves 52 and 62 and the connectors 53 and 63. The feed terminal 51 is also referred to as an ESC rod 51, and the feed terminal 61 is also referred to as a heater rod 61.

The electrostatic chuck 20 with such a structure also constitutes the wafer mount 10 by being bonded to the cooling plate 30 through the bonding layer 40, similarly to the electrostatic chuck 20 in FIG. 1. FIG. 5 omits the illustration of the cooling plate 30 and the bonding layer 40.

In addition, a plurality of lift pin holes 16 penetrate the ceramic plate 12 in a thickness direction in FIG. 5. Specifically, the lift pin holes 16 penetrate also the bonding layer 40 and the cooling plate 30, and are holes into which lift pins (not illustrated) for lifting the wafer 100 disposed on the mounting surface 20a from the bottom are inserted from the bottom of the wafer mount 10. Similarly, the wafer mount 10 in FIG. 1 includes a plurality of lift pin holes, although illustration thereof is omitted in FIG. 5.

A wafer mount including the electrostatic chuck with the structure in FIG. 5 makes it possible to increase the electrostatic attraction in the electrostatic chuck without increasing a contact area between a workpiece and the electrostatic chuck.

While the invention has been shown and described in detail, the foregoing description is in all aspects illustrative and not restrictive. It is therefore understood that numerous modifications and variations can be devised without departing from the scope of the invention.

What is claimed is:

1. An electrostatic chuck fixing a workpiece via electrostatic attraction, the electrostatic chuck comprising:
    a mounting surface on which the workpiece is disposed; and
    an electrostatic chuck electrode which is buried inside the electrostatic chuck and to which a voltage is applied so that the workpiece disposed on the mounting surface is fixed via electrostatic attraction,
    wherein the mounting surface has an uneven structure including a plurality of protrusions two-dimensionally spaced apart with predetermined pitches, and a depression that is flat between the protrusions,
    each of the protrusions includes:
        a flat portion having a flat surface, the flat surface being vertical to a thickness direction of the electrostatic chuck and all of the flat surfaces of the protrusions having a same uniform height; and
        a sloped portion around the flat portion, the sloped portion having a height decreasing from the flat portion toward the depression, and
    the sloped portion has an upper surface with a slope angle of 65 degrees or higher and 84 degrees or lower to the thickness direction of the electrostatic chuck.

2. The electrostatic chuck according to claim 1, wherein the protrusions are tapered in a cross-sectional view.

3. The electrostatic chuck according to claim 2, wherein each of the protrusions is continuous with at least one of the flat portion or the depression via a curved surface.

4. The electrostatic chuck according to claim 1, wherein each of the flat portions is shaped like a circle in a plan view, and each of the sloped portions is shaped like a ring in the plan view.

5. The electrostatic chuck according to claim 1, wherein each of the flat portions has a height ranging from 10 μm to 50 μm from the depression.

6. A susceptor, comprising:
    an electrostatic chuck fixing a workpiece via electrostatic attraction; and
    a cooling plate bonded to the electrostatic chuck, the cooling plate including
    a fluid channel through which a coolant is cyclically supplied to allow the cooling plate to cool the workpiece,
    the electrostatic chuck including:
        a mounting surface on which the workpiece is disposed;
        an electrostatic chuck electrode which is buried inside the electrostatic chuck and to which a voltage is applied so that the workpiece disposed on the mounting surface is fixed via electrostatic attraction; and
        a heater electrode buried inside the electrostatic chuck,
    wherein the mounting surface has an uneven structure including a plurality of protrusions two-dimensionally spaced apart with predetermined pitches, and a depression that is flat between the protrusions,
    each of the protrusions includes:
        a flat portion having a flat surface, the flat surface being vertical to a thickness direction of the electrostatic chuck and all of the flat surfaces of the protrusions having a same uniform height; and
        a sloped portion around the flat portion, the sloped portion having a height decreasing from the flat portion toward the depression, and
    the sloped portion has an upper surface with a slope angle of 65 degrees or higher and 84 degrees or lower to the thickness direction of the electrostatic chuck.

7. A susceptor, comprising:
    an electrostatic chuck fixing a workpiece via electrostatic attraction; and
    a hollow shaft attached to the electrostatic chuck,
    the electrostatic chuck including:
        a mounting surface on which the workpiece is disposed;
        an electrostatic chuck electrode which is buried inside the electrostatic chuck and to which a voltage is applied so that the workpiece disposed on the mounting surface is fixed via electrostatic attraction; and
        a heater electrode buried inside the electrostatic chuck,
    wherein the mounting surface has an uneven structure including a plurality of protrusions two-dimensionally spaced apart with predetermined pitches, and a depression that is flat between the protrusions,
    each of the protrusions includes:
        a flat portion having a flat surface, the flat surface being vertical to a thickness direction of the electrostatic chuck and all of the flat surfaces of the protrusions having a same uniform height; and
        a sloped portion around the flat portion, the sloped portion having a height decreasing from the flat portion toward the depression, and
    the sloped portion has an upper surface with a slope angle of 65 degrees or higher and 84 degrees or lower to the thickness direction of the electrostatic chuck.

8. The electrostatic chuck according to claim 2,
wherein each of the flat portions is shaped like a circle in
   a plan view, and
each of the sloped portions is shaped like a ring in the plan
   view.

9. The electrostatic chuck according to claim 3,
wherein each of the flat portions is shaped like a circle in
   a plan view, and
each of the sloped portions is shaped like a ring in the plan
   view.

10. The electrostatic chuck according to claim 2,
wherein each of the flat portions has a height ranging from
   10 µm to 50 µm from the depression.

11. The electrostatic chuck according to claim 3,
wherein each of the flat portions has a height ranging from
   10 µm to 50 µm from the depression.

12. The electrostatic chuck according to claim 4,
wherein each of the flat portions has a height ranging from
   10 µm to 50 µm from the depression.

13. The electrostatic chuck according to claim 8,
wherein each of the flat portions has a height ranging from
   10 µm to 50 µm from the depression.

14. The electrostatic chuck according to claim 9,
wherein each of the flat portions has a height ranging from
   10 µm to 50 µm from the depression.

15. The susceptor according to claim 6,
wherein the protrusions are tapered in a cross-sectional
   view.

16. The susceptor according to claim 15,
wherein each of the protrusions is continuous with at least
   one of the flat portion or the depression via a curved
   surface.

17. The susceptor according to claim 6,
wherein each of the flat portions is shaped like a circle in
   a plan view, and
each of the sloped portions is shaped like a ring in the plan
   view.

18. The susceptor according to claim 7,
wherein the protrusions are tapered in a cross-sectional
   view.

19. The susceptor according to claim 18,
wherein each of the protrusions is continuous with at least
   one of the flat portion or the depression via a curved
   surface.

20. The susceptor according to claim 7,
wherein each of the flat portions is shaped like a circle in
   a plan view, and
each of the sloped portions is shaped like a ring in the plan
   view.

*   *   *   *   *